US012754691B1

(12) United States Patent
Hahn et al.

(10) Patent No.: US 12,754,691 B1
(45) Date of Patent: Oct. 6, 2026

(54) SELECTIVE COMPLETION SYNCHRONIZATION IN P2P CXL TRANSACTIONS

(71) Applicant: Sandisk Technologies, Inc., Milpitas, CA (US)

(72) Inventors: Judah Gamliel Hahn, Ofra (IL); Ariel Navon, Revava (IL); Alexander Bazarsky, Holon (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 19/201,436

(22) Filed: May 7, 2025

(51) Int. Cl.
*G06F 3/06* (2006.01)

(52) U.S. Cl.
CPC .......... *G06F 3/0655* (2013.01); *G06F 3/0614* (2013.01); *G06F 3/067* (2013.01)

(58) Field of Classification Search
CPC ....... G06F 3/0655; G06F 3/0614; G06F 3/067
See application file for complete search history.

(56) References Cited

U.S. PATENT DOCUMENTS

2019/0294575 A1* 9/2019 Dennison .............. G06F 9/3877
2021/0240655 A1 8/2021 Das Sharma
2022/0405212 A1* 12/2022 Kakaiya .............. G06F 12/1425
2023/0214157 A1 7/2023 Soi et al.
2023/0367513 A1 11/2023 Yang
2024/0211392 A1 6/2024 Johnson et al.

FOREIGN PATENT DOCUMENTS

CN 118363914 A 7/2024

OTHER PUBLICATIONS

"NVMe Queues Explained" dated Sep. 24, 2019.

* cited by examiner

*Primary Examiner* — Nicholas A. Paperno
(74) *Attorney, Agent, or Firm* — Patterson + Sheridan, LLP

(57) ABSTRACT

A performance bottleneck may form during high traffic scenarios in a CXL fabric. Performance bottleneck may lead to inefficient or inaccurate P2P CXL communications of system components. Sync-point operations, where new data is validated to have indeed been written to the CXL memory, help avoid the inaccuracies but are expensive to perform as it adds extra traffic and latency on the host interface. A data storage device for improving the timing of sync points includes performing a sync-point operation after the last transaction of posted write commands. In some embodiments, the sync-point operations are performed based on a determination of various conditions of the storage system. In some embodiments, the sync-point operations are performed via sending a deferrable memory write request (DMWr) or an unordered I/O (UIO) write command.

20 Claims, 6 Drawing Sheets

SELECTIVE COMPLETION SYNCHRONIZATION IN P2P CXL TRANSACTIONS

BACKGROUND OF THE DISCLOSURE

Field of the Disclosure

Embodiments of the present disclosure generally relate to a data storage device for improving the timing of synchronization of commands completion in the system.

Description of the Related Art

Peripheral Component Interconnect Express (PCIe) and Non-Volatile Memory Express (NVMe) commands are submitted and completed using a series of queues. When input and output (I/O) commands are executed, the storage device will perform Direct Memory Access (DMA) transfers across the PCIe bus and then complete the command by writing to a completion queue (CQ) in host memory. However, there is also an option for the storage device to submit an interrupt for the host to be aware that the completion was posted to the CQ. Compute Express Link (CXL) protocol provides for a high speed very low latency memory bus, which can allow direct access to CPU cache memory (with cache coherency maintained by the CXL protocol). However, high traffic in the CXL fabric may create a performance bottleneck, particularly as the amount of memory attached to servers increase. When there is a performance bottleneck, peer to peer (P2P) CXL communication of some system components become inefficient.

Thus, there is a need in the art for an improved data storage device that optimally times the synchronization of command completion in a system.

SUMMARY OF THE DISCLOSURE

A performance bottleneck may form during high traffic scenarios in a CXL fabric. Performance bottleneck may lead to inefficient or inaccurate P2P CXL communications of system components. Sync-point operations, where new data is validated to have indeed been written to the CXL memory, help avoid the inaccuracies but are expensive to perform as it adds extra traffic and latency on the host interface. A data storage device for improving the timing of sync points includes performing a sync-point operation after the last transaction of posted write commands. In some embodiments, the sync-point operations are performed based on a determination of various conditions of the storage system. In some embodiments, the sync-point operations are performed via sending a deferrable memory write request (DMWr) or an unordered I/O (UIO) write command.

In one embodiment, a data storage device includes at least one memory device; and a controller coupled to the at least one memory device, wherein the controller is configured to: receive a plurality of write commands to write data to a first memory device of the at least one memory device, wherein the plurality of write commands comprises at least one posted write command and at least one non-posted write command; perform at least one posted write command of the plurality of write commands; evaluate at least one condition of the data storage device; determine whether to perform a sync-point operation based on the evaluating, wherein the sync-point operation validates whether the at least one posted write command was actually written to the first memory device; and perform the sync-point operation, wherein the sync-point operation comprises performing at least one non-posted write command of the plurality of write commands.

In another embodiment, a data storage device includes one or more Compute Express Link (CXL) memory devices; and a controller coupled to the one or more CXL memory devices, wherein the controller is configured to: receive a plurality of write commands to write data to a CXL memory device of the one or more CXL memory devices, perform at least one posted write command of the plurality of write commands; evaluate at least one condition of the data storage device; determine whether to perform a sync-point operation based on the evaluating, wherein the sync-point operation validates whether the at least one posted write command was actually written to the CXL memory device; and perform the sync-point operation, wherein the sync-point operation comprises performing at least one non-posted write command of the plurality of write commands or a deferrable write command.

In yet another embodiment, a data storage device includes means to store data using a Compute Express Link (CXL); and a controller coupled to the means to store data, wherein the controller is configured to: receive a plurality of write commands to write data to the means to store data, perform at least one posted write command of the plurality of write commands; evaluate at least one condition of the data storage device; determine whether to perform a sync-point operation based on the evaluating, wherein the sync-point operation validates whether the at least one posted write command was actually written to the means to store data; and perform the sync-point operation, wherein the sync-point operation comprises performing a non-posted write command of the plurality of write commands or a deferrable write command, wherein the at least one condition comprises one or more of: a number of write commands performed since a last performance of the sync-point operation is greater than or equal to a first threshold; and a time elapsed since the last performance of the sync-point operation is greater than or equal to a second threshold.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

A performance bottleneck may form during high traffic scenarios in a CXL fabric. Performance bottleneck may lead to inefficient or inaccurate P2P CXL communications of system components. Sync-point operations, where new data is validated to have indeed been written to the CXL memory, help avoid the inaccuracies but are expensive to perform as it adds extra traffic and latency on the host interface. A data storage device for improving the timing of sync points includes performing a sync-point operation after the last transaction of posted write commands. In some embodiments, the sync-point operations are performed based on a determination of various conditions of the storage system. In some embodiments, the sync-point operations are performed via sending a deferrable memory write request (DMWr) or an unordered I/O (UIO) write command.

Figure 1:
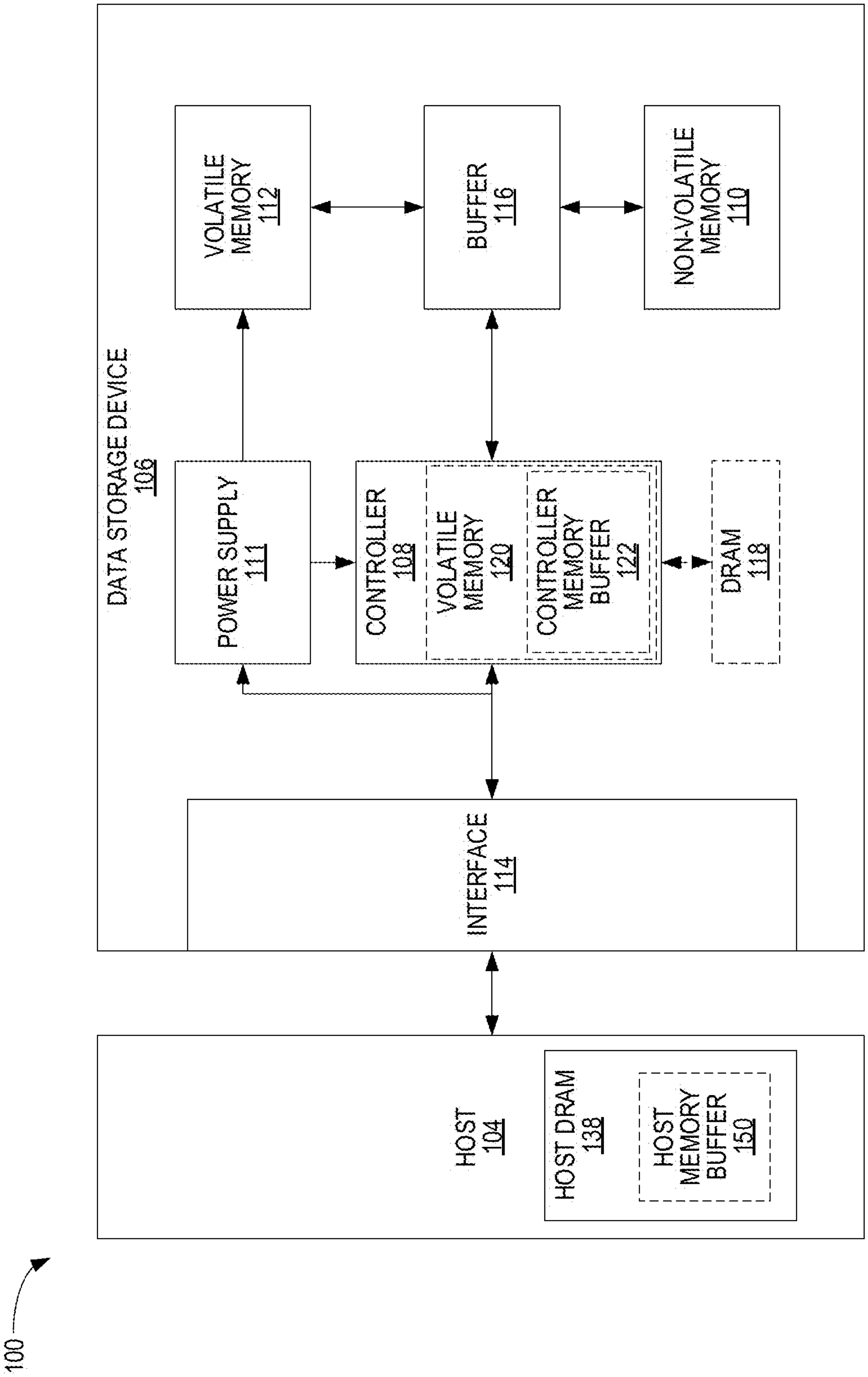
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, P Cle Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with non-volatile memory express (NVMe) protocol or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR 4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
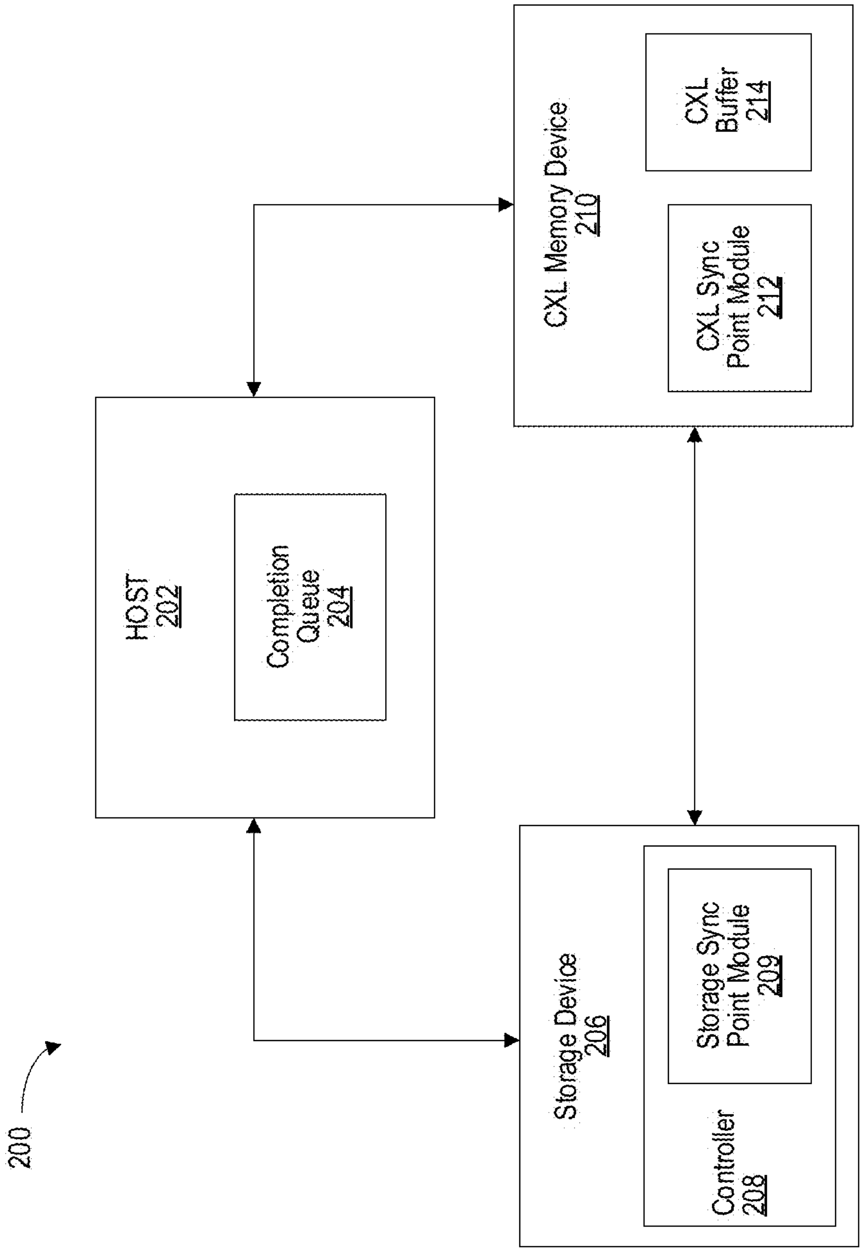
FIG. 2 is a schematic block diagram illustrating a storage system implementing a P2P CXL architecture, according to certain embodiments.

FIG. 2 is a schematic block diagram illustrating a storage system 200 implementing a P2P CXL architecture, according to certain embodiments. CXL is an industry standard that provides a high speed very low latency memory bus, which can allow direct access to CPU cache memory (with cache coherency maintained by the CXL protocol). Many industry partners such as switch and DRAM providers have adopted the CXL standard. CXL runs on the P Cle bus, with the same PCIe physically handling both PCIe I/O and CXL.

A primary reason for supporting CXL capability at an enterprise level (e.g., servers) is to attach additional memory (e.g., DRAM), graphics processing units (GPUs), and/or data processing units (DPUs) that would want to use the additional memory. Without any P2P communication and given the future of CXL attached devices (GPUs, Memory Expansion, etc.), any I/O or request to the storage device that points to an address in the CXL memory space must first go through the host root complex before being forwarded out to the CXL fabric, and vice versa. This results in a performance bottleneck, particularly as, enabled by CXL, the amount of memory attached to server increase.

To avoid the potential bottleneck by using P2P transfers, data may be moved directly from the CXL data buffer to the standard data storage (e.g., an SSD). However, without additional modifications, notifying the data sender of operation completion via an interrupt may cause issues. For example, if the storage device just sends the data directly to CXL memory and the interrupt to the Host CPU, the system may be exposed to a possible race scenario. There may be a case that while data is on its way to the CXL memory, the Host CPU has already received the interrupt and proceeds to read old data from CXL memory. In such system, this case could easily occur as there are two separate paths for data and control. The data path is P2P from storage device to CXL memory, while the control path is from the storage device to Host CPU. A solution is to ensure that the new data is really written in CXL memory before posting the interrupt to Host CPU. Ensuring that the new data is really written to the CXL memory could be performed in several ways. For example, in the simplest implementation, a sync-point operation (i.e., a point to conduct the syncing operation) could be conducted by reading the last data from CXL memory before posting the interrupt. It is noted that conducting a sync-point operation increases the cost of the system since it adds extra traffic and latency on the Host interface. However, conducting sync-point operations are more critical in low-queue depth or random read workloads where a sync point is required per 4 KB of data transfer.

As explained below, certain embodiments of the present disclosure may be used to optimize and facilitate this P2P CXL communication, while overcoming the drawbacks in other P2P CXL communication methods. For example, in certain embodiments, the timing of the synchronization of command completion in the system is optimized. As a result, the efficiency of P2P CXL communication of some of the system components is increased. In some embodiments, additional methods of ensuring that user data really did arrive to the target may be implemented in combination with other embodiments of the disclosure.

As shown in FIG. 2, a storage system 200 implementing a P2P CXL architecture having synchronization modules added to the storage device and the CXL memory device is depicted. Storage system 200 comprises a host 202, a storage device 206, and a CXL memory device 210. The host 202 may be the host 104 of FIG. 1 and comprises a completion queue 204. The completion queue 204 may be stored in the host memory, for example, host DRAM or a host memory buffer. Storage device 206 may be the data storage device 106 of FIG. 1 and comprises a controller 208 (which may be an implementation of controller 108 of FIG. 1). In some embodiments, the controller 208 comprises a storage sync point module 209. The storage sync point module 209 is configured to determine which memory write operations are posted and which memory write operations are non-posted. CXL memory device 210 comprises a CXL sync point module 212 and a CXL buffer 214.

Non-posted write commands are commands that require the target reading element to acknowledge the receipt of the source's write command. Posted (i.e., regular) write commands are commands where the source of the write command passes the data to the requested pointer without requiring an acknowledgement of receipt. Accordingly, posted write commands are more expensive than non-posted write commands in latency and power as they require synchronization between the sender and receiver.

Figure 3:
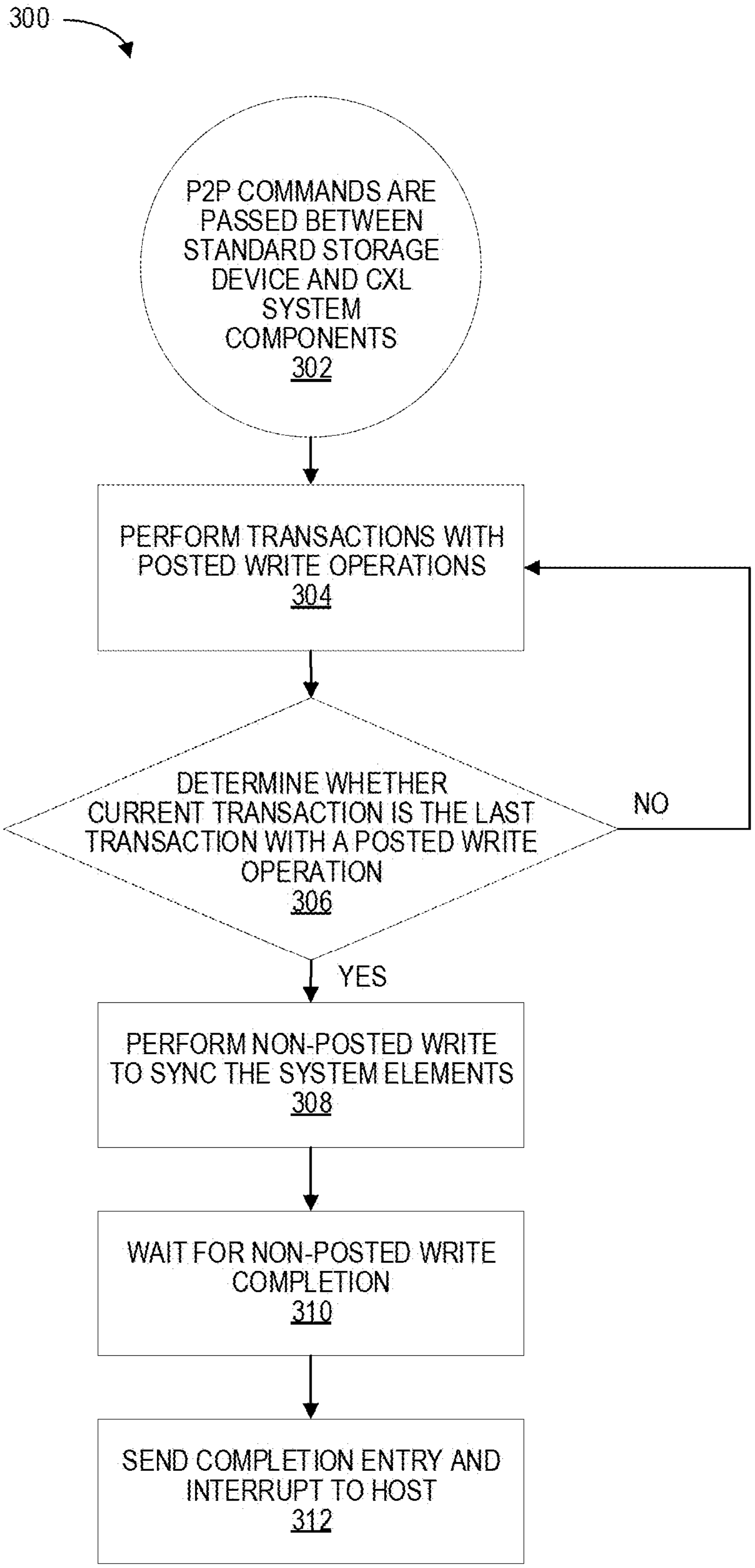
FIG. 3 is a flowchart illustrating a method for command synchronization after a last command transaction, according to certain embodiments.

FIG. 3 is a flowchart illustrating a method 300 for command synchronization after a last command transaction, according to certain embodiments. Method 300 defines a sync point for a regular write transaction. Instead of a sync point per command transaction, multiple command transactions are coalesced and share a sync point, which occurs at the final transaction with a posted write operation (i.e., a posted write command). That is, a single, last posted write command transaction is used as a sync point to sync all the posted write command transactions, after which a non-posted write command is performed to sync all the posted write command transactions performed. A sync-point operation is expensive in latency and power. Thus, it would be beneficial to coalesce as many transactions as possible before setting a sync point. The idea is to align the sync point with the NVMe interrupt coalescing such that the number of sync points will not be per command but per posted interrupts to the Host.

Method 300 starts at operation 302 where P2P commands are passed between the storage device (e.g., storage device 206 of FIG. 2) and CXL memory device (e.g., CXL memory device 210 of FIG. 2). At operation 304, the controller (e.g., controller 208 of FIG. 2) performs transactions with posted write operations. At operation 306, the controller determines whether the current transaction is the last transaction with a posted write operation. If there are additional transactions with posted write operations left, then the controller continues to perform the transactions. If there are no more transactions with posted write operations left, then at operation 308, the controller performs a non-posted write operation to sync the system elements. At operation 310, the controller waits for the non-posted write command completion. At operation 312, the controller sends a completion entry and interrupt to the host. Since partial command transactions do not have a meaning to the host in a P2P transfer, it is most efficient to sync the system once the entire posted write command finished transferring.

Figure 4:
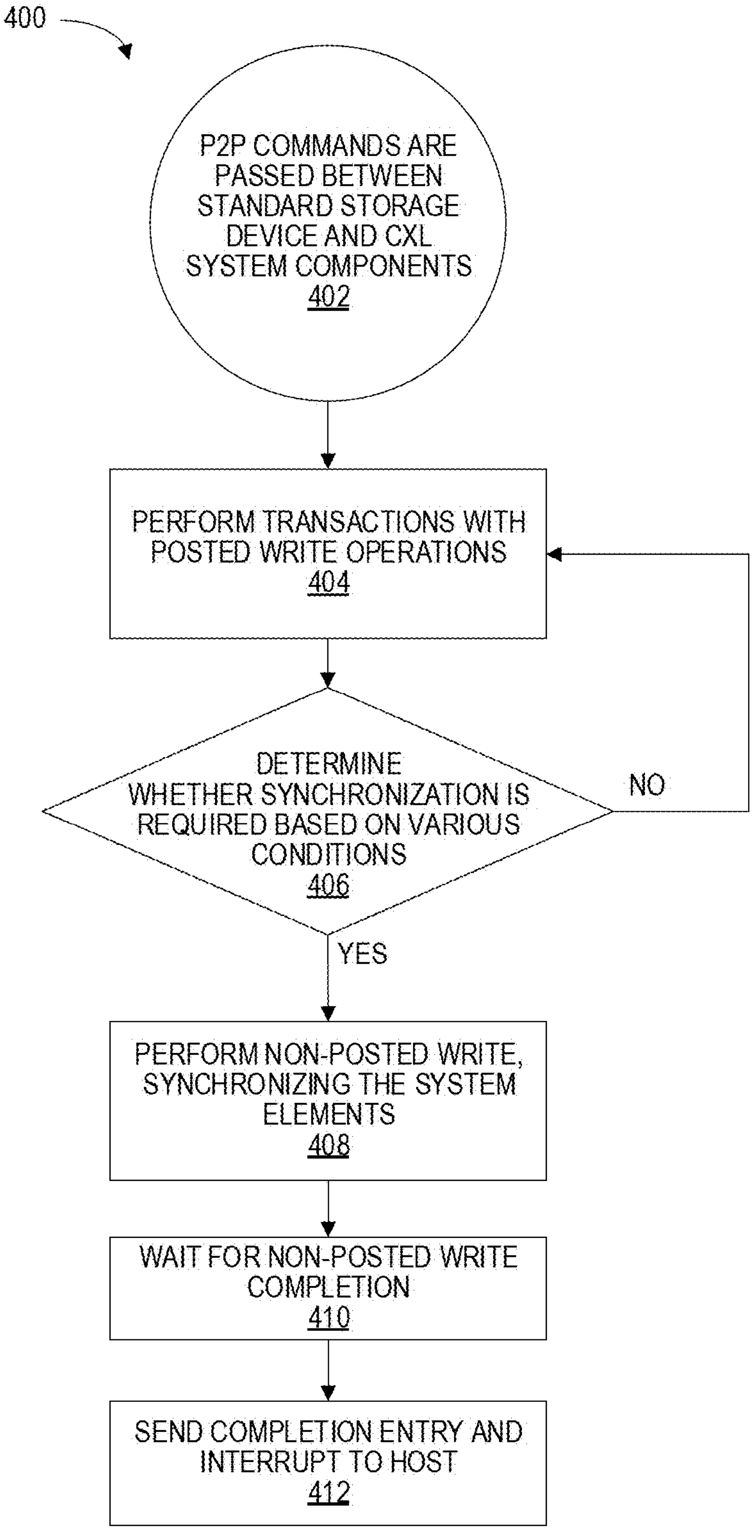
FIG. 4 is a flowchart illustrating a method for command synchronization at a sync-point, according to certain embodiments.

FIG. 4 is a flowchart illustrating a method 400 for command synchronization at a sync-point, according to certain embodiments. In method 400 for command synchronization at a sync-point, a controller (e.g., controller 208 of FIG. 2) makes an informed decision on the timing properties of sync points and decides whether to perform a sync-point operation.

Method 400 starts at operation 402, where P2P commands are passed between the storage device (e.g., storage device 206 of FIG. 2) and CXL memory device (e.g., CXL memory device 210 of FIG. 2). At operation 404, the controller performs transactions with posted write operations. At operation 406, using a storage sync point module (e.g., the storage sync point module 209 of FIG. 2), the controller determines whether synchronization (i.e., a sync-point operation) is required based on various conditions of the storage system (e.g., storage system 200 of FIG. 2). If the controller determines that synchronization is not required based on the various conditions, then the controller returns to operation 404. If the controller determines that synchronization is required based on the various conditions, then at operation 408, the controller performs a non-posted write command to sync the system elements.

The determination whether synchronization is required is based on various conditions. For example, the controller may evaluate one or more of: a number of end points connected to the bridge; the current status of the end points connected to the bridge (e.g., whether all end points are in full workload); whether a latency drop is permitted at the current time; conditions of the storage device (e.g., device temperature, bandwidth limiters, and power limits); probability that any of the other system parts using the data is in a non-synced state; whether an interval for synchronization (e.g., based on time elapsed or number of performed transactions since last syncing). In some embodiments, the end points may be a number of storage devices, host controllers (e.g., DPUs, GPUs, and/or CPUs), or a combination of components thereof that share the same memory device. In some embodiments, the bridge may be a PCIe switch (e.g., an intermediate switch) or root port that the storage device or end points are attached to. The number of concurrent accesses and corresponding memory pressures may further be considered to determine how often synchronous I/O is used. The probability that any of the other system parts using the data is in a non-synced state—i.e., a storage device determines that there is a probability greater than a threshold that post commands that have already been performed were not actually written to the CXL memory device—may be considered in the determination because of the potential race and other adverse effects. That is, even if there is a shared buffer, it is possible that a GPU may want to begin consuming data even before the CPU formally closes the I/O request by receiving an interrupt and scanning the completion queue. This is not exactly a "non-synced" state, since the data in the buffer is updated, however, the host CPU and control path may not be fully synchronized. Further, in some embodiments, the interval for synchronization based on a number of performed transactions since last syncing may be based on a number of posted write commands performed, thus a sync-pointer operation may not necessarily need to wait until all transactions are finished. These various conditions are considered in the determination in order to optimize the overall system performance.

At operation 408, the controller performs a non-posted write operation to sync the system elements. At operation 410, the controller waits for the non-posted write command completion. At operation 412, the controller sends a completion entry and interrupt to the host.

Figure 5:
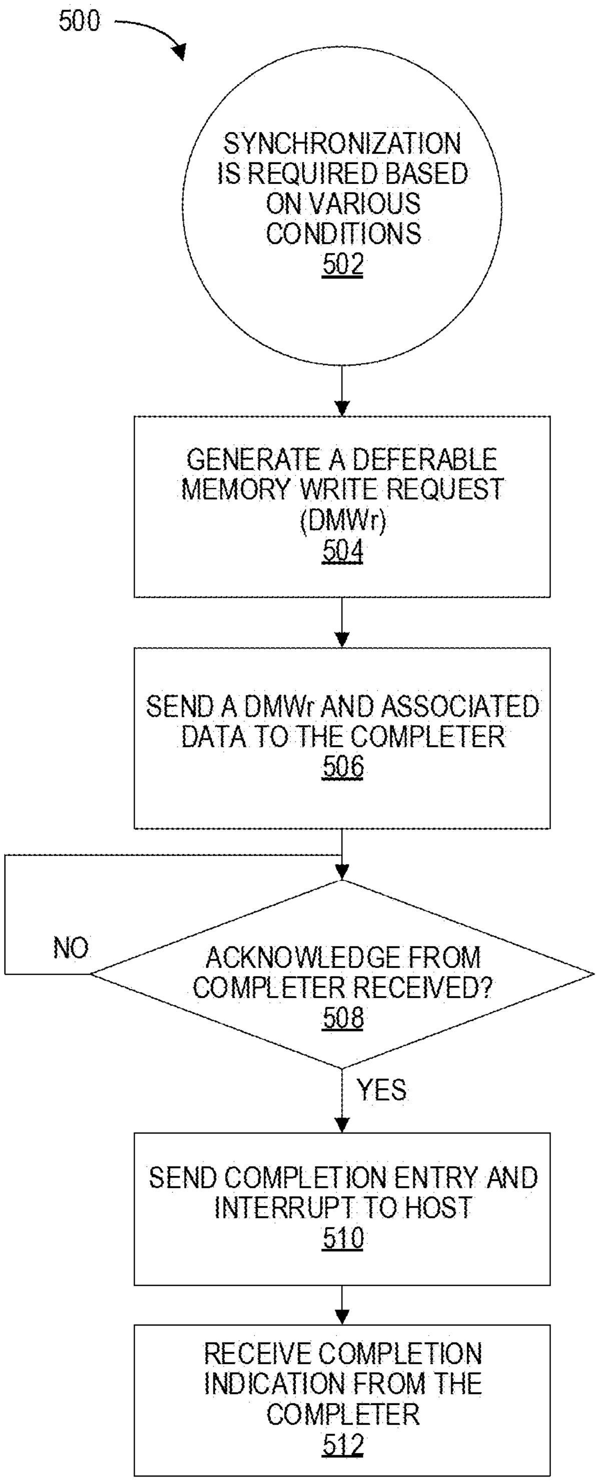
FIG. 5 is a flowchart illustrating a method of sending a DMWr, according to certain embodiments.

FIG. 5 is a flowchart illustrating a method 500 of sending a deferrable memory write request (DMWr), according to certain embodiments. Method 500 includes sending a DMWr to sync system elements, which is an optional non-posted request that enables a scalable high-performance mechanism to implement shared work queues and similar capabilities. By sending a DMWr, storage devices can have a single shared work queue and accept work items from multiple non-cooperating software agenda in a non-blocking way.

A system using method 500 requires that each DMWr be "atomic;" that is, a single trigger must result in a single Request. For example, the initial trigger, to generate the DMWr, the subsequent routing to the Completer's (e.g., the CXL memory device) resulting actions, and the return of the corresponding completion. The single Request may not be subdivided or be acted upon by the Completer in such a way that no observer can see a partial result, and a single completion being returned to the Requester (e.g., the storage device), without subdivision. When using DMWr, all components that are involved in the P2P communication must support the DMWr protocol.

Method 500 beings at operation 502, where the controller (e.g., controller 208 of FIG. 2) determines that synchronization is required based on various conditions (e.g., at operation 406 of method 400). At operation 504, the controller generates a DMWr. At operation 506, the controller sends the DMWr and associated data to the Completer (e.g., the CXL memory device 210 of FIG. 2). At operation 508, the controller determines whether the Completer has acknowledged the DMWr. It is noted that, upon receiving the DMWr, the Completer may acknowledge the Request but may decide to defer the completion to a later time. Nonetheless, the Completer sends an acknowledgement back to the Requester (e.g., the storage device), indicating receipt of the data and the intention to complete the Request but not immediately. Once the controller determines that acknowledgment from the Completer has been received, at operation 510, the controller may send a completion entry and interrupt the host, this may occur before receiving a completion indication from the Completer. That is, the storage device does not need to wait for a completion indication from the Completer before interrupting the host. At operation 512, the controller receives the completion indication from the Completer that the deferred command was completed.

Thus, since the completion/interrupt may be to a different memory device, the atomicity of the DMWr is not depended on for the completion. However, once acknowledged, a read to the same location by a different entity may be stalled until the deferred write is completed, which is the intent of waiting for acknowledgement but not completion of in this case.

Figure 6:
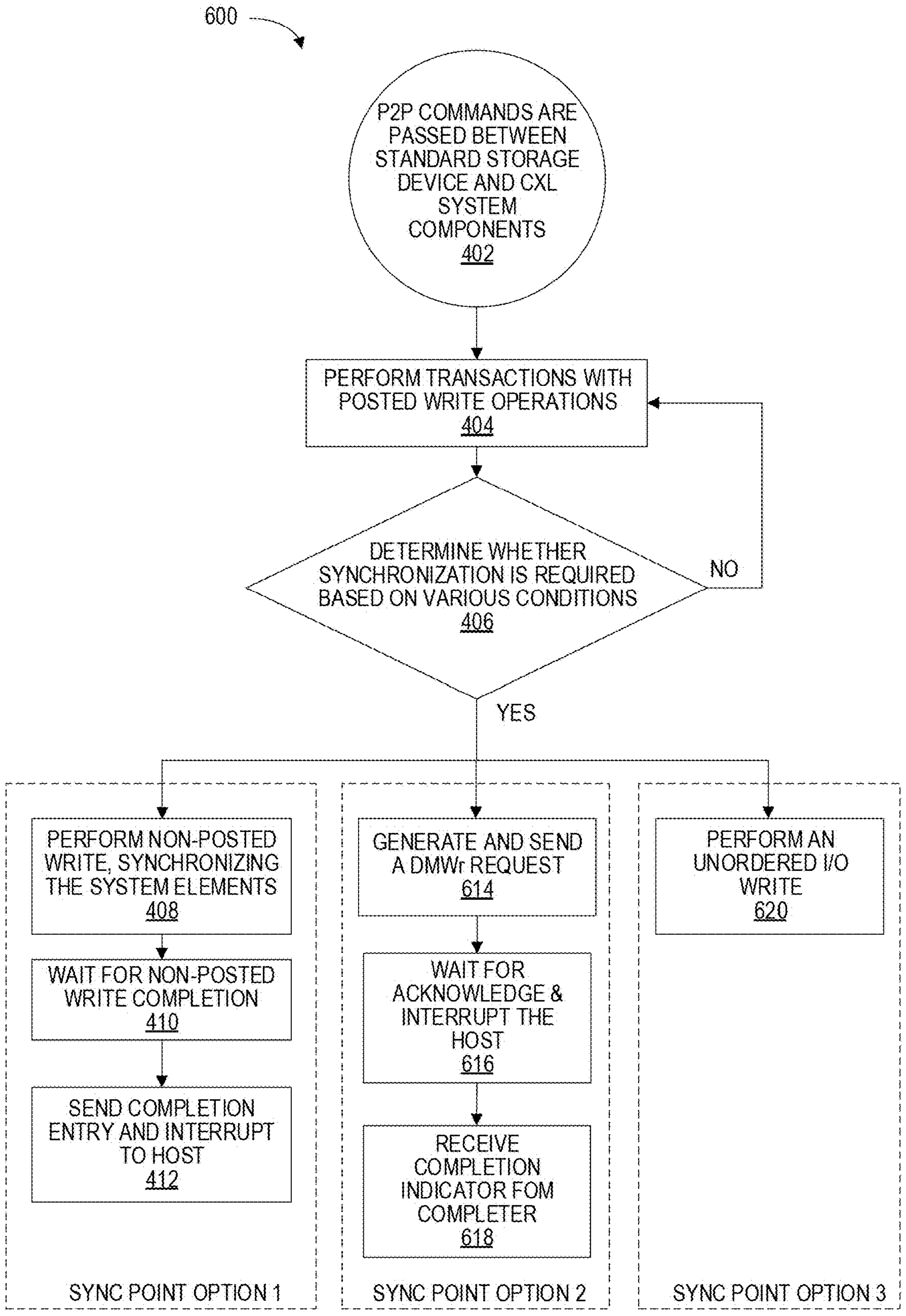
FIG. 6 is a flowchart illustrating a method for command synchronization at a sync-point, according to certain embodiments.

FIG. 6 is a flowchart illustrating a method 600 for command synchronization at a sync-point, according to certain embodiments. Method 600 incorporates method 400 but includes additional sync point options after the controller determines, at operation 406, that synchronization is required based on various conditions. The first sync point operation comprises operations 408, 410, and 412 and the second sync point operation comprises method 500, as discussed above in FIGS. 4 and 5.

If the controller determines that synchronization is required based on the various conditions, then the controller may perform any of a first sync point operation (i.e., sync point option 1), a second sync point operation (i.e., sync point option 2), or a third sync point operation (i.e., sync point option 3) to sync the system elements. The decision may be based on the aggregated queue depth and target location of the NVMe read commands that are fulfilled by the memory write operations and the size of each command that is fulfilled by the memory write operations. For example, in a workload that consists of 10,000 NVMe read operations queued at once, where each operation is 512 bytes, and the target location is a CXL shared memory buffer, the sync point may be selected at every 1 MB of transfers rather than at every 512 byte transfer. Correspondingly, a workload that consists of 32 NVMe sequential read operations of 2 MB each may trigger a sync point at every 2 MB (i.e. completion of every NVMe read command).

The performance of the first sync point option is discussed above, in FIG. 4. If the controller performs the second sync point option, then at operation 614, as discussed in operations 504, 506, the controller generates and sends a DMWr and associated data to a Completer. At operation 616, as discussed in operations 508, 510, the controller waits for acknowledgement, indicating the Completer's receipt and intention to complete the DMWr before sending a completion entry and interrupting the host. At operation 618, as discussed in operation 512, the controller receives a completion indication from the Completer that the DMWr is completed.

If the controller performs the third sync point option, then at operation 620, the controller performs an unordered I/O (UIO) write command. A storage device with UIO support will sync the system components by sending the write command via a PCIe feature called Simplified Virtual Channel (SVC), which is a method of separating different traffic classes from each other. A command sent via UIO is a different traffic class from standard I/O and is defined to use a virtual channel (e.g., ID=3). This virtual channel configuration is how UIO is enabled and disabled by a host. It is up to the host to check for UIO capability from the SSD through the CSL switch all the way to the target CXL device, and only if the entire path is UIO capable will the host enable UIO. Thus, in some embodiments, the storage system 200 of FIG. 200 is configured to support UIO capabilities via the communicative components communicatively coupling the host 202, storage device 206, and the CXL memory device 210.

Since UIO uses different P Cle read/write messages, UIO memory writes require completion and can be used for syncing the system elements. The same memory can be reached using standard P Cle memory writes, sent using the traffic channels of UIO does not require completion because a different virtual channel is used. Instead, these UIO writes will be routed through the root port. In some embodiments, the translation from P Cle UIO into CXL occurs within the switch fabric.

By optimizing the timing of synchronization of command completion in storage system, the efficiency and accuracy of P2P CXL communications are improved. For example, based on evaluating and determining a sync-point based on various conditions of the system; or, based on sending a DMWr or a command via UIO.

In one embodiment, a data storage device includes at least one memory device; and a controller coupled to the at least one memory device, wherein the controller is configured to: receive a plurality of write commands to write data to a first memory device of the at least one memory device, wherein the plurality of write commands comprises at least one posted write command and at least one non-posted write command; perform at least one posted write command of the plurality of write commands; evaluate at least one condition of the data storage device; determine whether to perform a sync-point operation based on the evaluating, wherein the sync-point operation validates whether the at least one posted write command was actually written to the first memory device; and perform the sync-point operation, wherein the sync-point operation comprises performing at least one non-posted write command of the plurality of write commands.

The first memory device comprises a Compute Express Link (CXL) memory device. The at least one condition comprises performing all the posted write commands of the plurality of write commands. The at least one condition comprises one or more of: a total number of the at least one memory devices coupled to the controller; a current workload status of the at least one memory devices coupled to the controller; a device temperature of the at least one memory devices coupled to the controller; and a latency drop of the data storage device being currently greater than a threshold. The at least one condition comprises detecting that the at least one posted write command was not actually written to the first memory device. The at least one condition comprises one or more of: a number of write commands performed since a last performance of the sync-point operation is greater than or equal to a first threshold; and a time elapsed since the last performance of the sync-point operation is greater than or equal to a second threshold. The controller is configured to wait for an indication that the performance of the at least one non-posted write command is completed. The controller is configured to interrupt a host device after the indication is received. The sync-point operation further comprises sending a deferrable memory write request (DMWr) to the first memory device. The performance of the at least one non-posted write command occurs on a different traffic channel than the performance of the at least one posted write command. The different traffic channel is a virtual traffic channel.

In another embodiment, a data storage device includes one or more Compute Express Link (CXL) memory devices; and a controller coupled to the one or more CXL memory devices, wherein the controller is configured to: receive a plurality of write commands to write data to a CXL memory device of the one or more CXL memory devices, perform at least one posted write command of the plurality of write commands; evaluate at least one condition of the data storage device; determine whether to perform a sync-point operation based on the evaluating, wherein the sync-point operation validates whether the at least one posted write command was actually written to the CXL memory device; and perform the sync-point operation, wherein the sync-point operation comprises performing at least one non-posted write command of the plurality of write commands or a deferrable write command.

The at least one posted write command is performed via a non-virtual traffic channel, and the at least one non-posted write command is performed via a virtual traffic channel. The at least one non-posted write command is routed through a root port. The controller is configured to receive an indication from the CXL memory device that the performance of the at least one non-posted write command is complete. The controller is configured to send a completion entry and interrupt a host device after the indication is received. Performing the deferrable write command includes generating a deferrable memory write request (DMWr); sending the DMWr to the CXL memory device; receiving acknowledgement of receipt of the DMWr from the CXL memory device; receiving an indication from the CXL memory device that the DMWr has been performed; and sending a completion entry and interrupting a host device. The completion entry and host device interrupt occur before receipt of the indication that the DMWr has been performed. The at least one condition comprises one or more of: a probability that the at least one posted write command was not actually written to the CXL memory device; a number of write commands performed since a last performance of the sync-point operation is greater than or equal to a first threshold; and a time elapsed since the last performance of the sync-point operation is greater than or equal to a second threshold.

In yet another embodiment, a data storage device includes means to store data using a Compute Express Link (CXL); and a controller coupled to the means to store data, wherein the controller is configured to: receive a plurality of write commands to write data to the means to store data, perform at least one posted write command of the plurality of write commands; evaluate at least one condition of the data storage device; determine whether to perform a sync-point operation based on the evaluating, wherein the sync-point operation validates whether the at least one posted write command was actually written to the means to store data; and perform the sync-point operation, wherein the sync-point operation comprises performing a non-posted write command of the plurality of write commands or a deferrable write command, wherein the at least one condition comprises one or more of: a number of write commands performed since a last performance of the sync-point operation is greater than or equal to a first threshold; and a time elapsed since the last performance of the sync-point operation is greater than or equal to a second threshold.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:

at least one memory device; and a controller coupled to the at least one memory device, wherein the controller is configured to:

receive a plurality of write commands to write data to a first memory device of the at least one memory device, wherein the plurality of write commands comprises at least one posted write command and at least one non-posted write command;

perform at least one posted write command of the plurality of write commands;

evaluate at least one condition of the data storage device;

determine whether to perform a sync-point operation based on the evaluating, wherein the sync-point operation validates whether the at least one posted write command was actually written to the first memory device; and perform the sync-point operation, wherein the sync-point operation comprises performing at least one non-posted write command of the plurality of write commands.

2. The data storage device of claim 1, wherein the first memory device comprises a Compute Express Link (CXL) memory device.

3. The data storage device of claim 1, wherein the at least one condition comprises performing all the posted write commands of the plurality of write commands.

4. The data storage device of claim 1, wherein the at least one condition comprises one or more of:

a total number of the at least one memory devices coupled to the controller;

a current workload status of the at least one memory devices coupled to the controller;

a device temperature of the at least one memory devices coupled to the controller; and a latency drop of the data storage device being currently greater than a threshold.

5. The data storage device of claim 1, wherein the at least one condition comprises detecting that the at least one posted write command was not actually written to the first memory device.

6. The data storage device of claim 1, wherein the at least one condition comprises one or more of:

a number of write commands performed since a last performance of the sync-point operation is greater than or equal to a first threshold; and a time elapsed since the last performance of the sync-point operation is greater than or equal to a second threshold.

7. The data storage device of claim 1, wherein the controller is configured to wait for an indication that the performance of the at least one non-posted write command is completed.

8. The data storage device of claim 7, wherein the controller is configured to interrupt a host device after the indication is received.

9. The data storage device of claim 1, wherein the sync-point operation further comprises sending a deferrable memory write request (DMWr) to the first memory device.

10. The data storage device of claim 1, wherein the performance of the at least one non-posted write command occurs on a different traffic channel than the performance of the at least one posted write command.

11. The data storage device of claim 10, wherein the different traffic channel is a virtual traffic channel.

12. A data storage device, comprising:

one or more Compute Express Link (CXL) memory devices; and a controller coupled to the one or more CXL memory devices, wherein the controller is configured to:

receive a plurality of write commands to write data to a CXL memory device of the one or more CXL memory devices, perform at least one posted write command of the plurality of write commands;

evaluate at least one condition of the data storage device;

determine whether to perform a sync-point operation based on the evaluating, wherein the sync-point operation validates whether the at least one posted write command was actually written to the CXL memory device; and perform the sync-point operation, wherein the sync-point operation comprises performing at least one non-posted write command of the plurality of write commands or a deferrable write command.

13. The data storage of claim 12, wherein the at least one posted write command is performed via a non-virtual traffic channel, and the at least one non-posted write command is performed via a virtual traffic channel.

14. The data storage of claim 13, wherein the at least one non-posted write command is routed through a root port.

15. The data storage device of claim 12, wherein the controller is configured to receive an indication from the CXL memory device that the performance of the at least one non-posted write command is complete.

16. The data storage device of claim 15, wherein the controller is configured to send a completion entry and interrupt a host device after the indication is received.

17. The data storage device of claim 16, wherein performing the deferrable write command comprises:

generating a deferrable memory write request (DMWr);

sending the DMWr to the CXL memory device;

receiving acknowledgement of receipt of the DMWr from the CXL memory device;

receiving an indication from the CXL memory device that the DMWr has been performed; and sending a completion entry and interrupting a host device.

18. The data storage device of claim 17, wherein the completion entry and host device interrupt occur before receipt of the indication that the DMWr has been performed.

19. The data storage of claim 12, wherein the at least one condition comprises one or more of:

a probability that the at least one posted write command was not actually written to the CXL memory device;

a number of write commands performed since a last performance of the sync-point operation is greater than or equal to a first threshold; and a time elapsed since the last performance of the sync-point operation is greater than or equal to a second threshold.

20. A data storage device, comprising:

means to store data using a Compute Express Link (CXL); and a controller coupled to the means to store data, wherein the controller is configured to:

receive a plurality of write commands to write data to the means to store data, perform at least one posted write command of the plurality of write commands;

evaluate at least one condition of the data storage device;

determine whether to perform a sync-point operation based on the evaluating, wherein the sync-point operation validates whether the at least one posted write command was actually written to the means to store data; and perform the sync-point operation, wherein the sync-point operation comprises performing a non-posted write command of the plurality of write commands or a deferrable write command, wherein the at least one condition comprises one or more of:

a number of write commands performed since a last performance of the sync-point operation is greater than or equal to a first threshold; and a time elapsed since the last performance of the sync-point operation is greater than or equal to a second threshold.

* * * * *